(12) United States Patent
Kadoya

(10) Patent No.: US 11,964,651 B2
(45) Date of Patent: Apr. 23, 2024

(54) TRAVELING CONTROL APPARATUS

(71) Applicant: SUBARU CORPORATION, Tokyo (JP)

(72) Inventor: Yuki Kadoya, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 260 days.

(21) Appl. No.: 17/486,023

(22) Filed: Sep. 27, 2021

(65) Prior Publication Data
US 2022/0097684 A1  Mar. 31, 2022

(30) Foreign Application Priority Data

Sep. 30, 2020  (JP) ................................. 2020-165532

(51) Int. Cl.
*B60W 30/045* (2012.01)
*B60W 30/16* (2020.01)

(52) U.S. Cl.
CPC ........ *B60W 30/045* (2013.01); *B60W 30/162* (2013.01); *B60W 2510/205* (2013.01); *B60W 2520/105* (2013.01); *B60W 2710/205* (2013.01); *B60W 2710/207* (2013.01); *B60W 2720/106* (2013.01)

(58) Field of Classification Search
None
See application file for complete search history.

(56) References Cited

U.S. PATENT DOCUMENTS

| 2008/0300766 A1* | 12/2008 | Kumabe | ......... B60W 30/18145 |
| | | | 701/98 |
| 2015/0094927 A1* | 4/2015 | Takahashi | ........... B60W 30/143 |
| | | | 701/93 |
| 2017/0361841 A1 | 12/2017 | Kojo | |

FOREIGN PATENT DOCUMENTS

JP          2017-222317 A      12/2017

* cited by examiner

*Primary Examiner* — Peter D Nolan
*Assistant Examiner* — Jacob Kent Besteman-Street
(74) *Attorney, Agent, or Firm* — TROUTMAN PEPPER HAMILTON SANDERS LLP

(57) ABSTRACT

A traveling control apparatus for a vehicle includes a steering angle detector, a vehicle speed detector, and a cruise control unit. The cruise control unit includes a steering angle speed detector, a steering angle correction value setting unit, and a target acceleration rate setting unit. The steering angle correction value setting unit sets a steering angle correction value, on the basis of a speed of the vehicle detected by the vehicle speed detector and a steering angle speed calculated by the steering angle speed detector. The target acceleration rate setting unit sets a target acceleration rate of a cruise control, on the basis of a steering angle and the speed of the vehicle. The steering angle is based on an addition of the steering angle correction value set by the steering angle correction value setting unit to the steering angle absolute value detected by the steering angle detector.

14 Claims, 8 Drawing Sheets

TRAVELING CONTROL APPARATUS

CROSS-REFERENCE TO RELATED APPLICATION

The present application claims priority from Japanese Patent Application No. 2020-165532 filed on Sep. 30, 2020, the entire contents of which are hereby incorporated by reference.

BACKGROUND

The technology relates to a traveling control apparatus.

Various proposals have been made on techniques related to a driving assist for vehicles in recent years. The driving assist reduces a burden to be imposed on a driver and allows for a comfortable and safe driving. Some of such techniques have been already put into practical use. Examples of the driving assist may include an adaptive cruise control (ACC) having a control that automatically maintains a distance between vehicles. The ACC recognizes a distance between an own vehicle and a preceding vehicle by a traveling environment recognition unit, and causes the own vehicle to travel in such a manner as to follow the preceding vehicle, or causes the own vehicle to travel at a preset vehicle speed set by a driver in a case where no preceding vehicle is present ahead of the own vehicle. For example, the traveling environment recognition unit includes a vehicle camera or various radar sensors mounted on the vehicle, or a combination thereof.

SUMMARY

An aspect of the technology provides a traveling control apparatus to be applied to a vehicle. The traveling control apparatus includes a steering angle detector, a vehicle speed detector, and a cruise control unit. The steering angle detector is configured to detect a steering angle absolute value of a steering wheel of the vehicle. The vehicle speed detector is configured to detect a speed of the vehicle. The cruise control unit is configured to cause the vehicle to travel at a constant speed that is based on a preset vehicle speed or cause the vehicle to travel and follow a preceding vehicle. The cruise control unit includes a steering angle speed detector, a steering angle correction value setting unit, and a target acceleration rate setting unit. The steering angle speed detector is configured to calculate a steering angle speed, on the basis of the steering angle absolute value detected by the steering angle detector. The steering angle correction value setting unit is configured to set a steering angle correction value, on the basis of the speed of the vehicle detected by the vehicle speed detector and the steering angle speed calculated by the steering angle speed detector. The target acceleration rate setting unit is configured to set a target acceleration rate of a cruise control, on the basis of a steering angle and the speed of the vehicle detected by the vehicle speed detector, in which the steering angle is set on the basis of an addition of the steering angle correction value set by the steering angle correction value setting unit to the steering angle absolute value detected by the steering angle detector.

An aspect of the technology provides a traveling control apparatus to be applied to a vehicle. The traveling control apparatus includes a steering angle detector, a vehicle speed detector, and circuitry. The steering angle detector is configured to detect a steering angle absolute value of a steering wheel of the vehicle. The vehicle speed detector is configured to detect a speed of the vehicle. The circuitry is configured to cause the vehicle to travel at a constant speed that is based on a preset vehicle speed or cause the vehicle to travel and follow a preceding vehicle; calculate a steering angle speed, on the basis of the steering angle absolute value detected by the steering angle detector. The circuitry is configured to set a steering angle correction value, on the basis of the speed of the vehicle detected by the vehicle speed detector and the calculated steering angle speed. The circuitry is configured to set a target acceleration rate of a cruise control, on the basis of a steering angle and the speed of the vehicle detected by the vehicle speed detector, in which the steering angle is set on the basis of an addition of the set steering angle correction value to the steering angle absolute value detected by the steering angle detector.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

A vehicle having a map locator function in addition to an ACC function also allows for a driving assist, such as an automatic driving, of an own vehicle to a destination along a route set on a road map, by detecting a current position of the own vehicle on the basis of data obtained from a known global navigation satellite system (GNSS). Such a driving assist acquires, from map data, data on a road such as a road shape or a curvature of a curve to allow the own vehicle to turn at an intersection or go round a curve with the ACC being maintained.

Unfortunately, not all of the vehicles available to the market have the map locator or the like. There are also some countries where a road information network necessary for performing the driving assist on the own vehicle is not developed. Further, the own vehicle sometimes travels under an environment in which a sensitivity of reception from GNSS satellites is low and in which it is not possible to effectively receive a positioning signal accordingly. For example, it is not possible to effectively receive the positioning signal when the own vehicle travels through buildings or inside a tunnel. Under such traveling conditions and environments described above, the ACC is performed only on the basis of data obtained from a traveling environment recognition unit.

As described previously, the ACC causes the own vehicle to accelerate or decelerate in such a manner as to follow a preceding vehicle to thereby keep a distance between the vehicles constant in a case where the preceding vehicle as a target to follow is detected, whereas the ACC causes the own vehicle to travel at a constant speed that is based on a preset vehicle speed in a case where the preceding vehicle as the target to follow is not detected.

For example, Japanese Unexamined Patent Application Publication (JP-A) No. 2017-222317 discloses a technique that reduces a burden to be imposed on a driver, by causing the ACC to be continued even when, after an own vehicle has entered an intersection while following a preceding vehicle, the own vehicle crosses an oncoming lane to make a turn in a direction of an intersecting lane.

The technique disclosed in JP-A No. 2017-222317 executes a regular ACC in a case where the preceding vehicle as the target to follow is not detected, when causing the own vehicle to cross the oncoming lane to make a turn in the direction of the intersecting lane. The ACC in this case causes the own vehicle to travel at a constant speed that is based on a preset vehicle speed. Accordingly, for example, when a driver operates a steering wheel to cause the own vehicle to travel in a direction of crossing the oncoming lane after the own vehicle has entered an intersection with a speed of the own vehicle, or an own vehicle speed, being decelerated to a certain speed, the ACC increases the own vehicle speed to a preset vehicle speed at a preset target acceleration rate.

Figure 9:
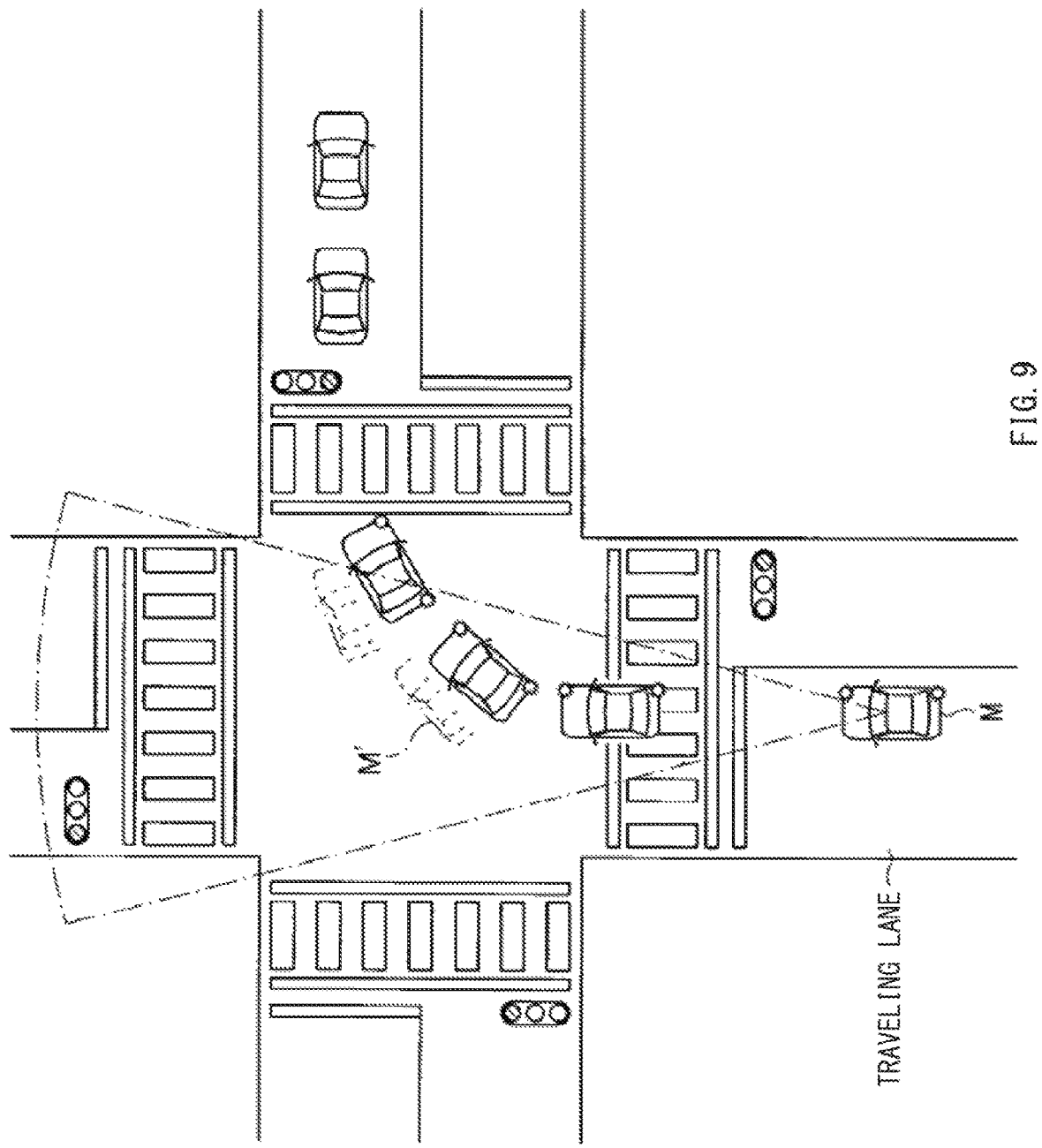
FIG. 9 is a diagram illustrating an example of making a right turn at an intersection on the basis of ACC.

Hence, the own vehicle so travels as to extend outwardly as denoted by a chain line in FIG. 9, in a case where the ACC increases the own vehicle speed at an acceleration rate similar to that of a case where the ACC causes the own vehicle to travel on a straight road. In this case, the driver can become frightened. To address this, a measure may be contemplated in which a yaw rate detected by a yaw rate sensor is read when the own vehicle makes a turn by a steering wheel operation performed by the driver during execution of the ACC. In a case where the yaw rate exceeds a predetermined threshold, an acceleration rate upon the ACC is reduced to a target acceleration rate set in response to the yaw rate.

This measure, however, does not involve the reduction of the acceleration rate until when the yaw rate equal to or greater than the predetermined threshold is detected during the turning of the own vehicle. Accordingly, the measure can easily cause a delay in timing of starting the reduction of the acceleration rate and thus makes it difficult to achieve an effect of sufficiently reducing the acceleration rate.

It is desirable to provide a traveling control apparatus that makes it possible to make a smooth turn without delaying a timing of reducing an acceleration rate with ACC being maintained, even in a case where a map locator is not mounted or in a situation where it is not possible to acquire data that is based on the map locator.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

Figure 1:
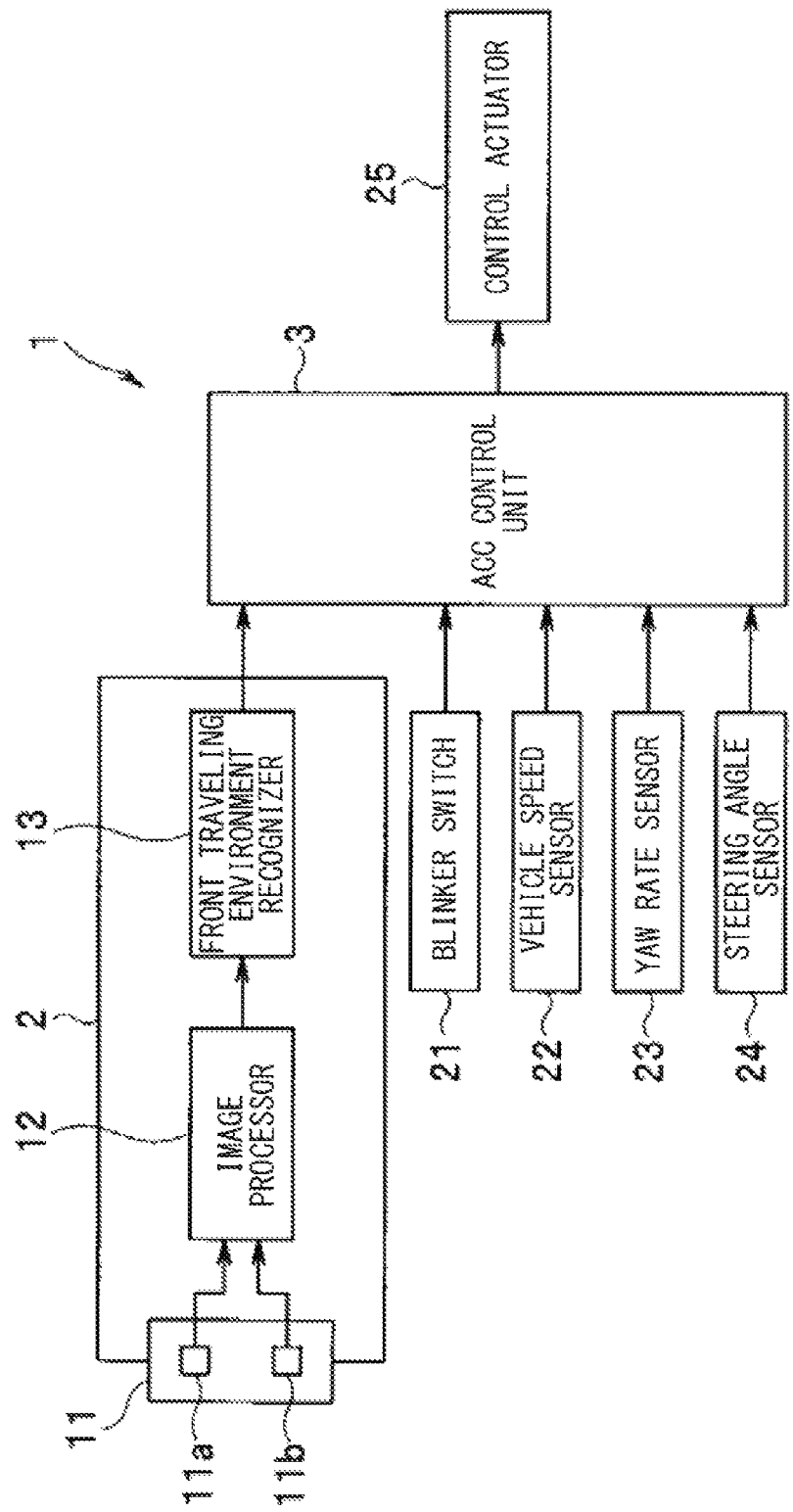
FIG. 1 is a diagram schematically illustrating an example of a traveling control apparatus according to one example embodiment of the technology.
Figure 10:
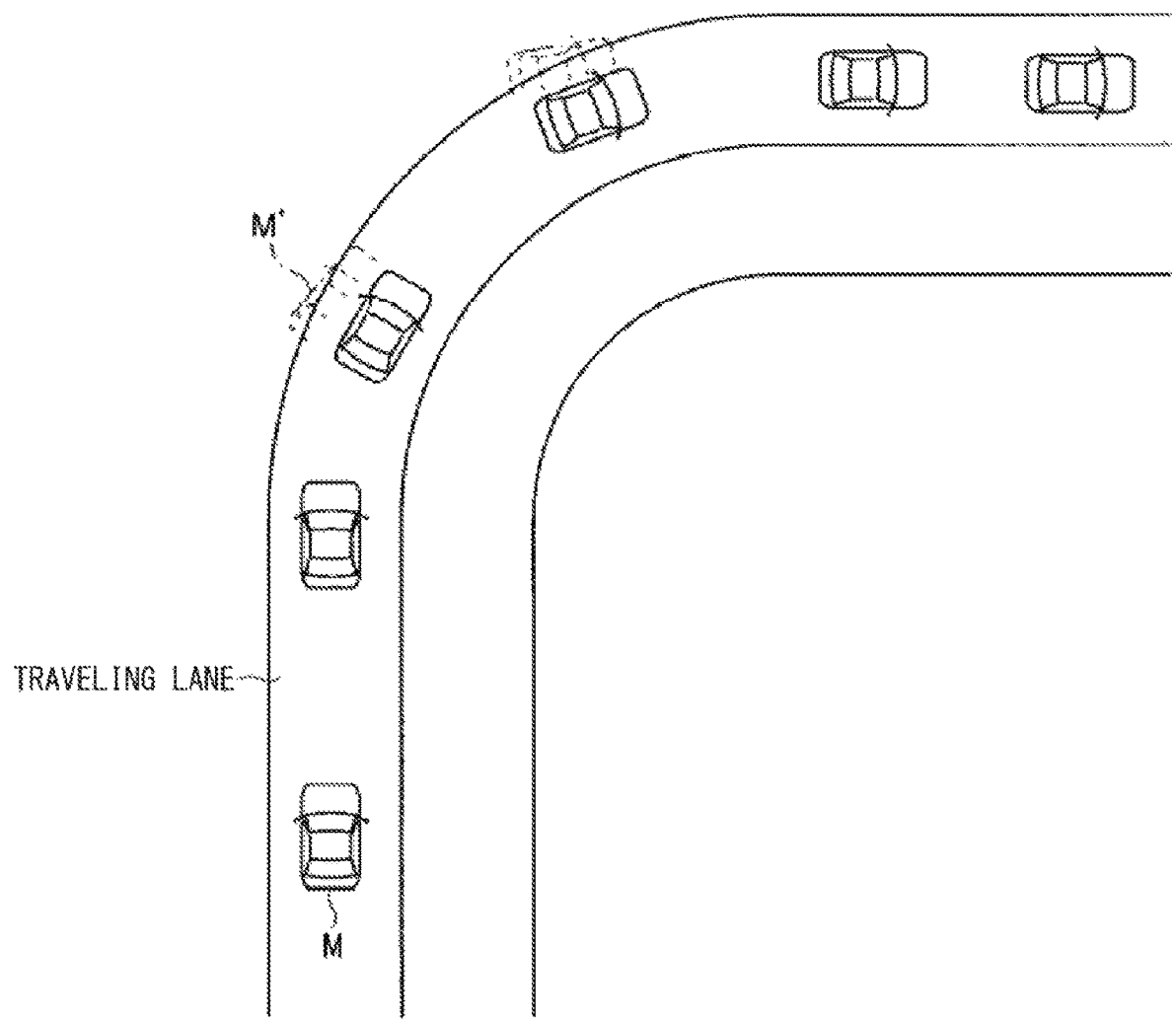
FIG. 10 is a diagram illustrating an example of traveling along a curved road on the basis of the ACC.

Referring to FIG. 1, a traveling control apparatus 1 may be provided in an own vehicle M illustrated in FIGS. 9 and 10. The traveling control apparatus 1 includes an ACC control unit 3. In one embodiment, the ACC control unit 3 may serve as a "cruise control unit". The traveling control apparatus 1 may also include a traveling environment recognition unit 2. The ACC control unit 3 and a later-described front traveling environment recognizer 13 of the traveling environment recognition unit 2 each may include a microcomputer and its peripheral devices. The microcomputer may have devices including a central processing unit (CPU), a read-only memory (ROM), and a random-access memory (RAM). The ROM may contain a control program that allows for operations set for each system. The ROM may also contain fixed data including a data table and a data map.

The traveling environment recognition unit 2 according to an example embodiment may include a camera unit 11, an image processor 12, and the front traveling environment recognizer 13. The camera unit 11 may be a stereo camera including a main camera 11a and a sub camera 11b. For example, the main camera 11a and the sub camera 11b may be provided at respective positions that are above a rear view mirror and on the right and the left sides of a middle position in a vehicle width direction near a windshield, and may be provided at an equal interval with a predetermined base line length being provided therebetween. The main camera 11a and the sub camera 11b each may include an imaging device such as a charge-coupled device (CCD) or a complementary metal-oxide semiconductor (CMOS). The main camera 11a and the sub camera 11b each may capture and acquire, with the imaging device, an image of a traveling environment in front of the own vehicle M including a traveling lane of the own vehicle M. The image processor 12 may perform a predetermined image process on thus-acquired data on the traveling environment ahead of the own vehicle M, and may output the traveling environment data having been subjected to the image process to the front traveling environment recognizer 13.

The front traveling environment recognizer 13 may recognize the front traveling environment on the basis of the traveling environment data having been subjected to the image process. In one embodiment, the front traveling environment recognizer 13 may serve as a "traveling environment recognizer". The front traveling environment may include: a road shape of a lane along which the own vehicle M travels, or an own vehicle traveling lane; an intersection; a traffic light indication such as a color lighted by a traffic light; a road sign; and a roadside obstacle. The road shape may include a road curvature in the middle of lane lines that define right and left of the lane, and a width between the right and the left lane lines, or a lane width. Non-limiting examples of the roadside obstacle may include a power pole, a telephone pole, a guardrail, a wall, and a parked vehicle.

The ACC control unit 3 may receive data on the front traveling environment recognized by the front traveling environment recognizer 13. The ACC control unit 3 may be coupled, on its input side, to various sensors and switches that detect various parameters necessary for executing a traveling control, including a blinker switch 21, a vehicle speed sensor 22, a yaw rate sensor 23, and a steering angle sensor 24, besides the traveling environment recognition unit 2. The blinker switch 21 may blink or turn on a blinker positioned on a turning side upon making a right turn or a left turn, making a lane change, etc. The vehicle speed sensor 22 may detect a speed (i.e., an own vehicle speed) Vs [Km/h] of the own vehicle M. In one embodiment, the vehicle speed sensor 22 may serve as a "vehicle speed detector". The yaw rate sensor 23 may detect a yaw rate that acts on the own vehicle M. The steering angle sensor 24 may detect a steering angle. In one embodiment, the steering angle sensor 24 may serve as a "steering angle detector". The steering angle sensor 24 may detect absolute values (i.e., a steering angle absolute value) |θst| [deg] of right and left steering angles which are based on a neutral position of a steering wheel as a reference.

The ACC control unit 3 may be coupled, on its output side, a control actuator 25. The control actuator 25 may include, as a generic term, actuators that allow for traveling of the own vehicle M, including a power actuator, an electronic power steering (EPS) actuator, and a brake actuator. The actuators each may be operated by a control signal supplied from the control actuator 25.

The power actuator may control an output of a drive source, such as an engine or an electric motor. The EPS actuator may control and drive an EPS motor. The brake actuator may adjust a brake hydraulic pressure to be supplied to a brake wheel cylinder provided for each wheel.

In a case where a preceding vehicle that travels at a speed equal to or less than a preset vehicle speed and serves as a target to be followed by the own vehicle M is detected on the basis of the data on the front traveling environment recognized by the front traveling environment recognizer 13 of the traveling environment recognition unit 2, the ACC control unit 3 may execute a follow-up traveling control that causes the own vehicle M to follow the detected preceding vehicle. In a case where the preceding vehicle that serves as the target to follow is not detected, the ACC control unit 3 may cause the own vehicle M to travel at a constant speed that is based on the preset vehicle speed set in advance by a driver.

The ACC control unit 3 may execute an acceleration rate reduction control to prevent the own vehicle M from extending outwardly, in a case where the own vehicle M having entered an intersection or the like makes a right turn or a left turn or where the own vehicle M travels along a curved road at a high speed by a steering wheel operation performed by the driver. For example, the ACC control unit 3 may execute the acceleration rate reduction control on the basis of processes of an acceleration rate reduction control routine illustrated in FIG. 2.

The acceleration rate reduction control routine may be executed for each predetermined calculation cycle. First, in step S1, the ACC control unit 3 may read the own vehicle speed Vs detected by the vehicle speed sensor 22 and the steering angle absolute value |θst| detected by the steering angle sensor 24.

Thereafter, in step S2, the ACC control unit 3 may determine whether a current traveling state of the own vehicle M falls within a turning region in which the acceleration rate reduction control is to be executed, on the basis of the own vehicle speed Vs and the steering angle absolute value |θst| and by referring to a turning region determining table. In one embodiment, the processes in steps S1 and S2 may serve as a process to be executed by a "turning region determining unit".

Figure 5:
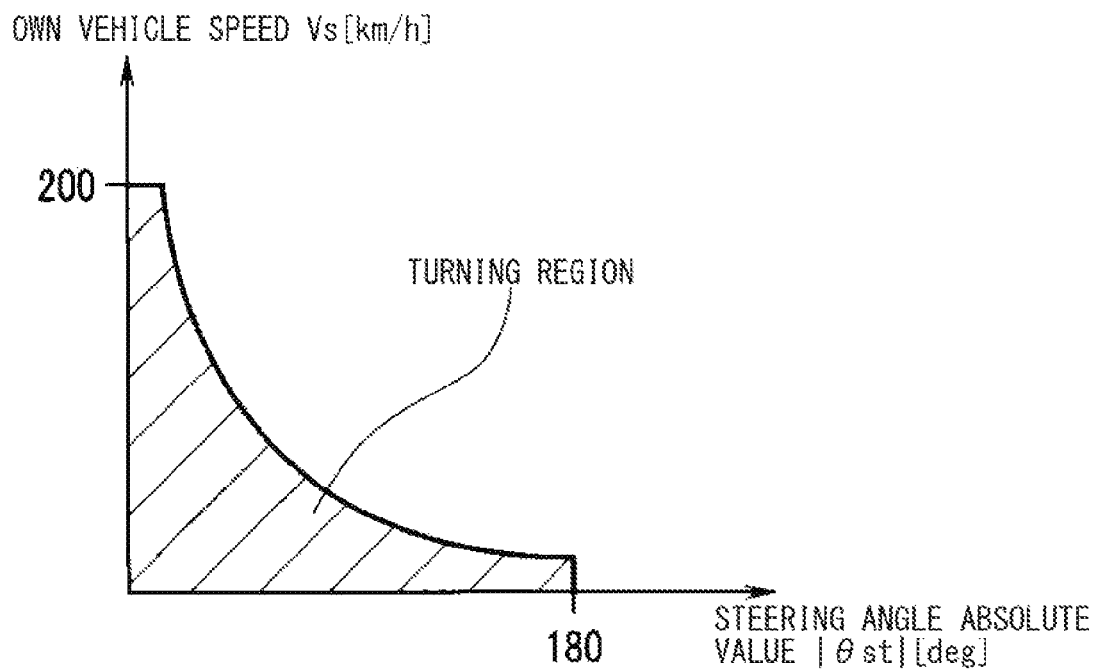
FIG. 5 is a conceptual diagram illustrating an example of a turning region determining table.

FIG. 5 illustrates an example of a concept of a turning region determining table. Referring to FIG. 5, the turning region may be set in the turning region determining table, in which the steering angle absolute value |θst| is smaller as the own vehicle speed Vs is higher whereas the steering angle absolute value |θst| is larger as the own vehicle speed Vs is lower. In other words, the turning region set in the turning region determining table may be a region that represents a tendency in which the own vehicle M involves an easier occurrence of a large yaw rate on the basis of a target acceleration rate set for a regular ACC. The turning region may be set in advance on the basis of an experiment or the like.

Non-limiting examples of a situation where the own vehicle M involves the easier occurrence of the excessive yaw rate may include: a case where the own vehicle speed Vs is low but the steering angle absolute value |θst| is relatively large, such as a case where the own vehicle M makes a right turn or a left turn at an intersection; and a case where the own vehicle M travels along a curved road at a high speed, where an understeer occurs easily. It should be appreciated that the turning region determining table may identify the region in which the excessive yaw rate occurs easily. Accordingly, the acceleration rate reduction control may be executed as long as the traveling state of the own vehicle M falls within the turning region, even if the own vehicle M travels under a situation that is other than a case where the own vehicle M corners at the intersection or where the own vehicle M corners at a high speed.

In step S2, if the ACC control unit 3 determines that the traveling state of the own vehicle M falls within the turning region (step S2: YES), the routine may proceed to step S3. If the ACC control unit 3 determines that the traveling state of the own vehicle M is out of the turning region (step S2: NO), the routine may end and the ACC control unit 3 may execute the regular ACC.

Figure 3:
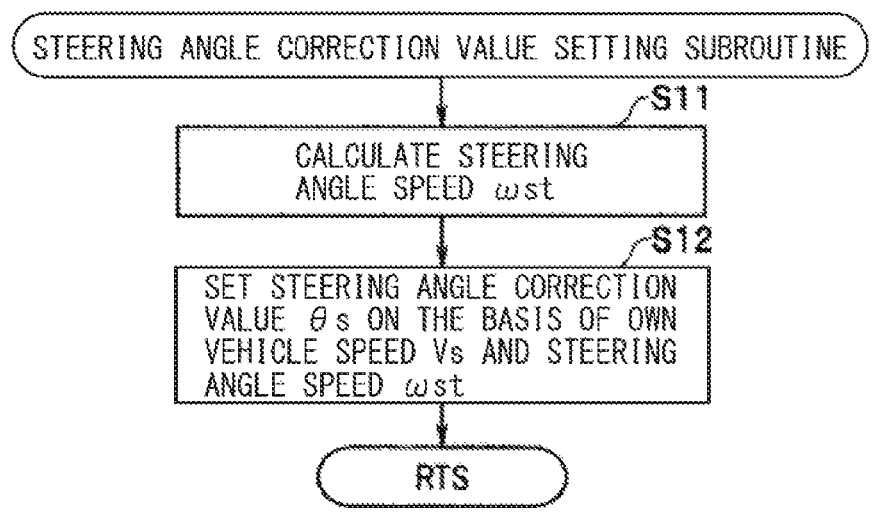
FIG. 3 is a flowchart illustrating an example of a steering angle correction value setting subroutine.

In step S3 after determining that the traveling state of the own vehicle M falls within the turning region, the ACC control unit 3 may calculate a steering angle correction value θs. Thereafter, the routine may proceed to step S4. A process to be performed in step S4 may be executed on the basis of processes of a steering angle correction value setting subroutine illustrated by way of example in FIG. 3.

In step S11 of the steering angle correction value setting subroutine, the ACC control unit 3 may first calculate a steering angle speed ωst [deg/s] by performing a time derivative of the steering angle absolute value |θst|. In one embodiment, the process in step S11 may serve as a process to be executed by a "steering angle speed detector".

Thereafter, in step S12, the ACC control unit 3 may set the steering angle correction value θs [deg], on the basis of the own vehicle speed Vs and the steering angle speed ωst and by referring to a steering angle correction value map through an interpolation calculation. Thereafter, the subroutine may proceed to step S4 of the acceleration rate reduction control routine illustrated in FIG. 2. In one embodiment, the process in step S12 may serve as a process to be executed by a "steering angle correction value setting unit".

Figure 6:
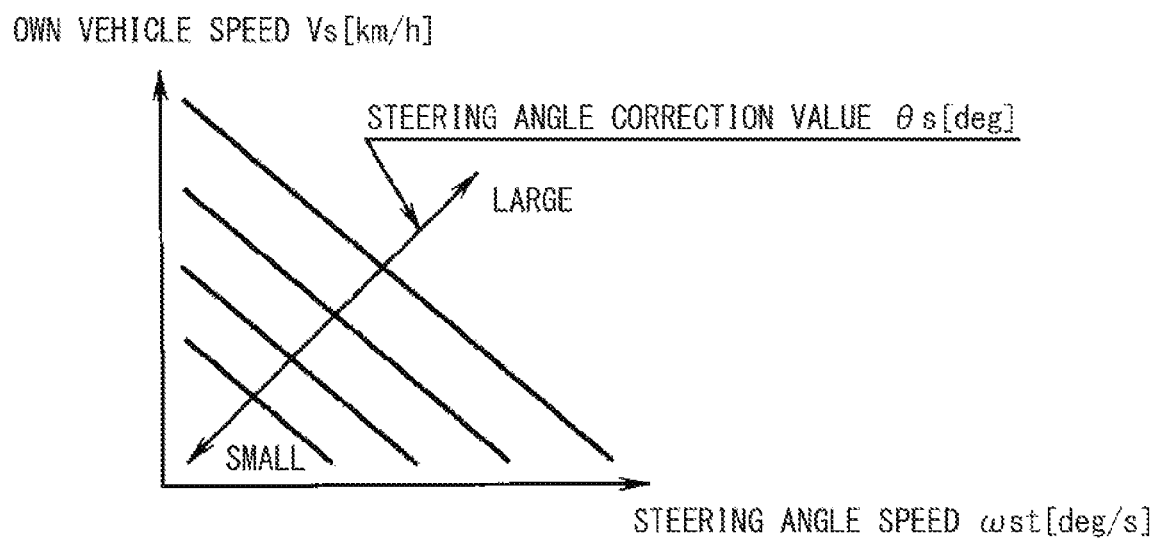
FIG. 6 is a conceptual diagram illustrating an example of a steering angle correction value map.

FIG. 6 illustrates an example of a concept of the steering angle correction value map. Referring to FIG. 6, the steering angle correction value θs may be set in the steering angle correction value map, in which the steering angle correction value θs is set to a small value in a case where both the own vehicle speed Vs and the steering angle speed ωst are low, and is set to a larger value as one of the own vehicle speed Vs and the steering angle speed ωst becomes higher. In other words, the steering angle correction value θs may be set to a larger value with an increasing tendency of a value of the yaw rate.

Figure 2:
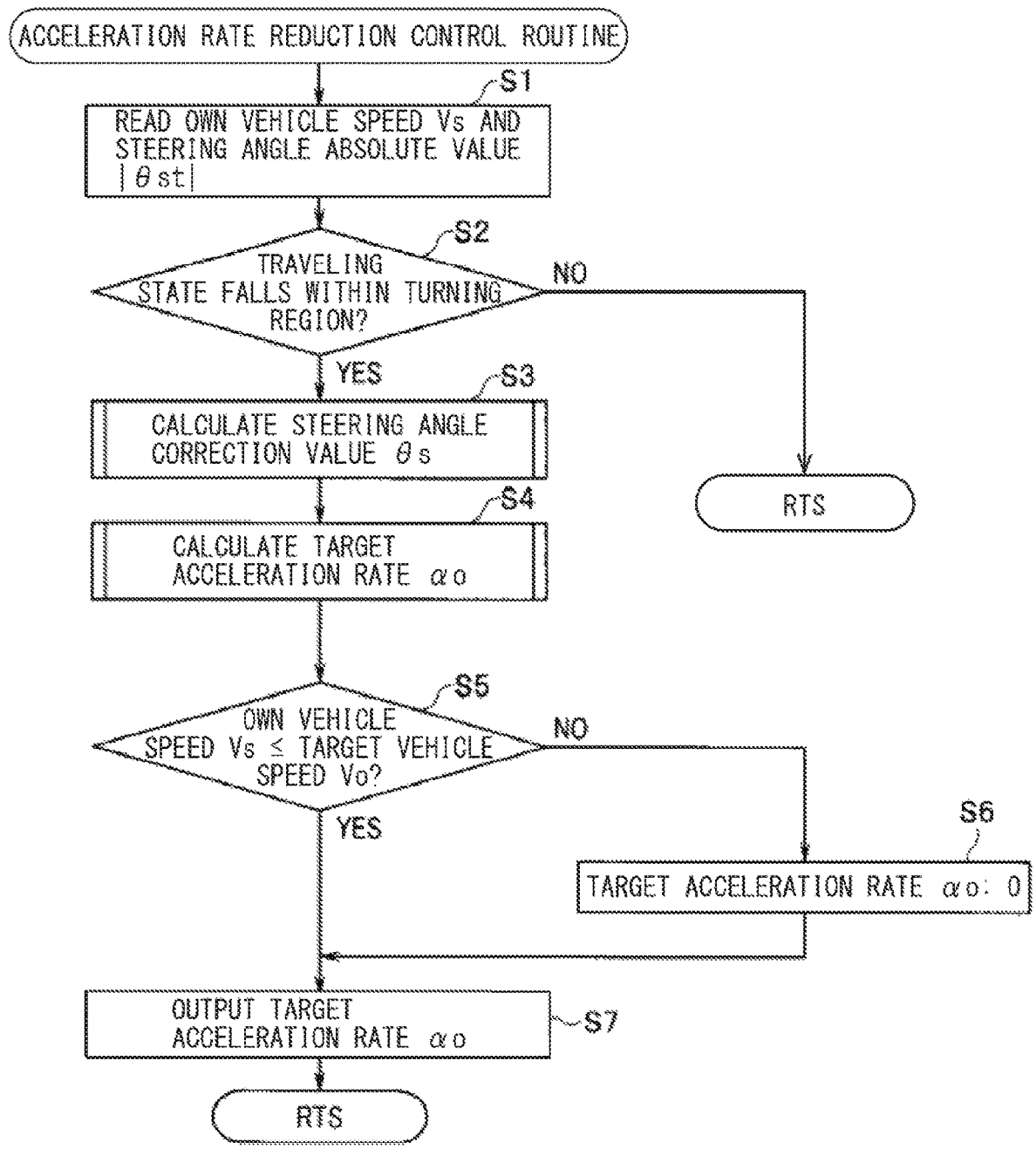
FIG. 2 is a flowchart illustrating an example of an acceleration rate reduction control routine.
Figure 4:
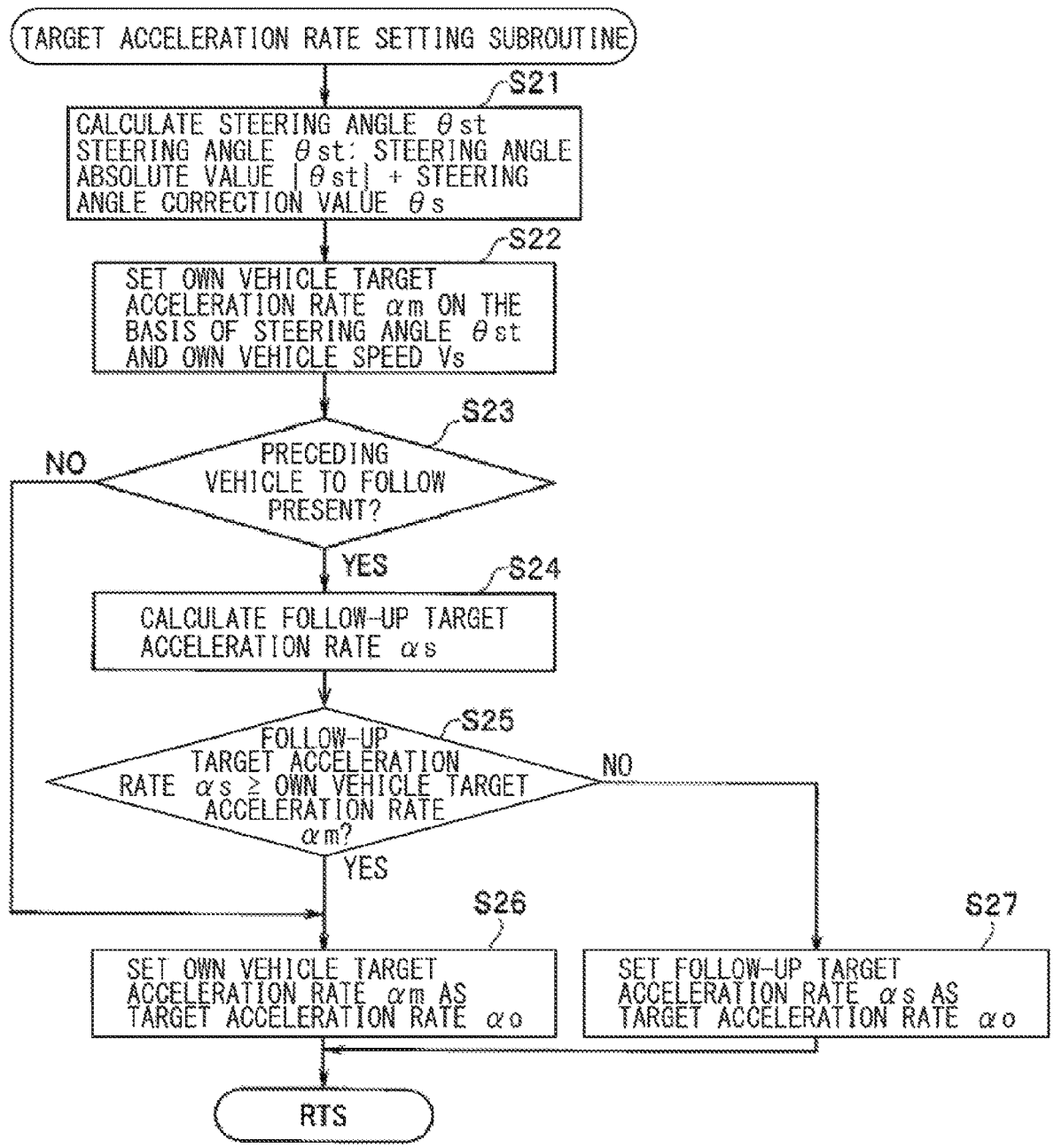
FIG. 4 is a flowchart illustrating a target acceleration rate setting subroutine.

In step S4 of the acceleration rate reduction control routine illustrated in FIG. 2, the ACC control unit 3 may set a target acceleration rate αo [m/s$^2$] required for the ACC. Thereafter, the routine may proceed to step S5. The process performed in step S4 may be executed on the basis of processes of a target acceleration rate setting subroutine illustrated by way of example in FIG. 4. In one embodiment, the processes in the target acceleration rate setting subroutine may serve as a process to be executed by a "target acceleration rate setting unit".

In step S21 of the target acceleration rate setting subroutine, the ACC control unit 3 may first calculate a steering angle θst by adding the steering angle correction value θs to the steering angle absolute value |θst|. Thereafter, in step S22, the ACC control unit 3 may set an own vehicle target acceleration rate αm [m/s$^2$], on the basis of the steering angle θst and the own vehicle speed Vs and by referring to a target acceleration rate map through an interpolation calculation. Thereafter, the subroutine may proceed to step S23.

Figure 7:
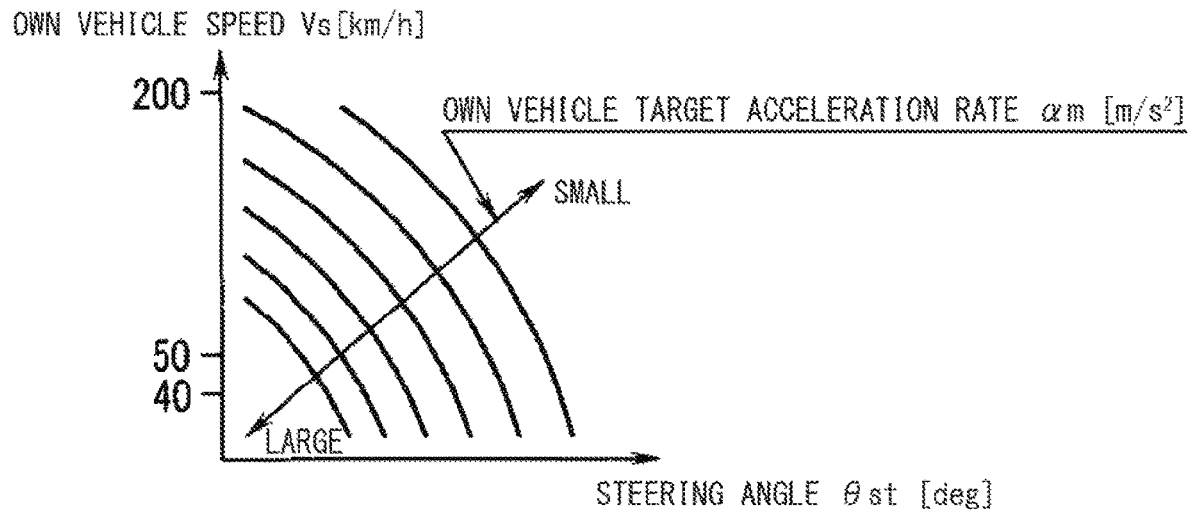
FIG. 7 is a conceptual diagram illustrating an example of a target acceleration rate map.

FIG. 7 illustrates an example of a concept of the target acceleration rate map. Referring to FIG. 7, the own vehicle target acceleration rate αm may be set in the target acceleration rate map, in which the own vehicle target acceleration rate αm becomes gradually smaller as both the own vehicle speed Vs and the steering angle θst become greater. It should be appreciated that the steering angle θst may be set as a result of increasing the steering angle absolute value |θst| by the steering angle correction value θs. It should also be appreciated that the steering angle correction value θs may be set to the larger value with the increasing tendency of the value of the yaw rate αs as described above. Accordingly, if the driver operates the steering wheel at a relatively high speed even upon a low speed traveling, the own vehicle target acceleration rate αm set on the basis of the own vehicle speed Vs and the steering angle θst may be set to a more reduced value in response to the operation of the steering wheel performed by the driver.

FIG. 9 illustrates an example in which the driver has caused the own vehicle M to make a turn (make a right turn in the drawing) in a direction of crossing an oncoming lane at an intersection by the steering wheel operation, during a traveling based on the ACC. In this case, if the traveling state of the own vehicle M upon the turning is determined as falling within the turning region, the ACC control unit 3 may detect the steering angle absolute value |θst| and set the steering angle correction value θs. Thus, it is possible to reduce the own vehicle target acceleration rate αm upon the turning quickly in response to the steering wheel operation performed by the driver. Hence, it is possible to prevent the outward traveling of the own vehicle M due to the excessive yaw rate αs denoted by a chain line in FIG. 9 before it happens upon making a turn, and thereby to achieve a better traveling stability.

The workings and example effects described above apply similarly to an example illustrated in FIG. 10, in which the own vehicle M makes a turn along a curved road at a high speed. In this case, when the driver operates the steering wheel upon entering the curved road during the traveling based on the ACC, the ACC control unit 3 may set the own vehicle target acceleration rate αm to a reduced value. The own vehicle target acceleration rate αm may be set on the basis of the steering angle absolute value |θst| detected by the steering angle sensor 24. Hence, it is possible to prevent the outward traveling of the own vehicle M due to the excessive yaw rate αs denoted by a chain line in FIG. 10 before it happens.

Thereafter, in step S23, the ACC control unit 3 may determine whether a preceding vehicle as a target to be followed by the own vehicle M is recognized in a turning direction, on the basis of the data on the front traveling environment recognized by the front traveling environment recognizer 13. If the ACC control unit 3 determines that the preceding vehicle to follow is present (step S23: YES), the subroutine may proceed to step S24. If the ACC control unit 3 determines that the preceding vehicle to follow is absent (step S23: NO), the subroutine may jump to step S26.

In step S24, the ACC control unit 3 may set a follow-up target acceleration rate αs that allows the own vehicle M to follow the preceding vehicle. In one embodiment, the process in step S24 may serve as a process to be executed by a "follow-up target acceleration rate setting unit".

For example, the follow-up target acceleration rate αs may be set on the basis of a distance deviation and a relative vehicle speed and by referring to a map. The distance deviation may be determined on the basis of a difference between a target inter-vehicular distance and an inter-vehicular distance (=the target inter-vehicular distance−(minus) the inter-vehicular distance). The target inter-vehicular distance may be set on the own vehicle speed Vs. The inter-vehicular distance may be a distance between the preceding vehicle and the own vehicle M. The relative vehicle speed may be a relative speed between the preceding vehicle and the own vehicle M (=a preceding vehicle speed−(minus) the own vehicle speed). It should be noted that characteristics of the map are disclosed in JP-A No. 2017-056765 filed earlier with the Japan Patent Office by the present Applicant and will not be described in detail.

Thereafter, in step S25, the ACC control unit 3 may determine which of the follow-up target acceleration rate αs and the own vehicle target acceleration rate αm is smaller in value (select-low) by comparing the follow-up target acceleration rate αs and the own vehicle target acceleration rate αm. If the ACC control unit 3 determines that the follow-up target acceleration rate αs is equal to or greater than the own vehicle target acceleration rate αm (αs≥αm) (step S25: YES), the subroutine may proceed to step S26. If the ACC control unit 3 determines that the follow-up target acceleration rate αs is less than the own vehicle target acceleration rate αm (αs<αm) (step S25: NO), the subroutine may proceed to step S27.

In step S26, the ACC control unit 3 may set the own vehicle target acceleration rate αm as the target acceleration rate αo that serves as a new target acceleration rate. Thereafter, the subroutine may proceed to step S5 of the acceleration rate reduction control routine illustrated in FIG. 2. If the subroutine proceeds to step S27 from step S25, the ACC control unit 3 may set the follow-up target acceleration rate αs as the target acceleration rate αo that serves as the new target acceleration rate. Thereafter, the subroutine may proceed to step S5 of the acceleration rate reduction control routine illustrated in FIG. 2.

In step S5 of the acceleration rate reduction control routine illustrated in FIG. 2, the ACC control unit 3 may compare the own vehicle speed Vs with a target vehicle speed Vo. If the ACC control unit 3 determines that the own vehicle speed Vs is greater than the target vehicle speed Vo (Vs>Vo) (step S5: NO), the routine may proceed to step S6. In step S6, the ACC control unit 3 may clear the target acceleration rate αo (αo: 0). Thereafter, the routine may proceed to step S7. If the ACC control unit 3 determines that the own vehicle speed Vs is equal to or less than the target vehicle speed Vo (Vs≤Vo) (step S5: YES), the routine may proceed to step S7. The target vehicle speed Vo may be set on the basis of the preceding vehicle speed in a case where the preceding vehicle as the target to follow is detected. In a case where the preceding vehicle as the target to follow is not detected, the target vehicle speed Vo may be set on the basis of the road shape acquired on the basis of the data on the front traveling environment recognized by the front traveling environment recognizer 13. Alternatively, in a case where the preceding vehicle as the target to follow is not detected, the target vehicle speed Vo may be set on the basis of the preset vehicle speed. Non-limiting examples of the road shape may include a curvature in a traveling direction from an intersection and a curvature of a curved road.

In step S7, the ACC control unit 3 may output the target acceleration rate αo. Thereafter, the ACC control unit 3 may end the acceleration rate reduction control routine illustrated in FIG. 2. The ACC control unit 3 may output, to the control actuator 25, a drive signal that corresponds to the target acceleration rate αo to cause the own vehicle M to travel at a predetermined acceleration rate. Thus, it is possible for the driver to cause the own vehicle M to travel stably at an intersection, along a curved road, etc., only by performing the steering wheel operation without pressing down on an accelerator pedal.

According to an example embodiment described above, whether the own vehicle M so travels as to fall within the turning region may be determined on the basis of the own vehicle speed Vs and the steering angle absolute value |θst|. In a case where the traveling state of the own vehicle M is determined as falling within the turning region, the steering angle correction value θs may be set on the basis of the own vehicle speed Vs and the steering angle speed cost. The thus-set steering angle correction value θs may be added to the steering angle absolute value |θst| to set the steering angle θst.

Further, the own vehicle target acceleration rate αm may be set on the basis of the steering angle θst and the own vehicle speed Vs. Thus, the own vehicle target acceleration rate αm may be set on the basis of the steering angle θst that is larger in value than the actual steering angle absolute value |θst|, and may have a relatively low value accordingly. Hence, as illustrated in FIG. 8, the target acceleration rate αo (the own vehicle target acceleration rate αm) that has been reduced in value is set immediately after the start of steering, upon turning of the own vehicle M by the steering wheel operation performed by the driver.

Figure 8:
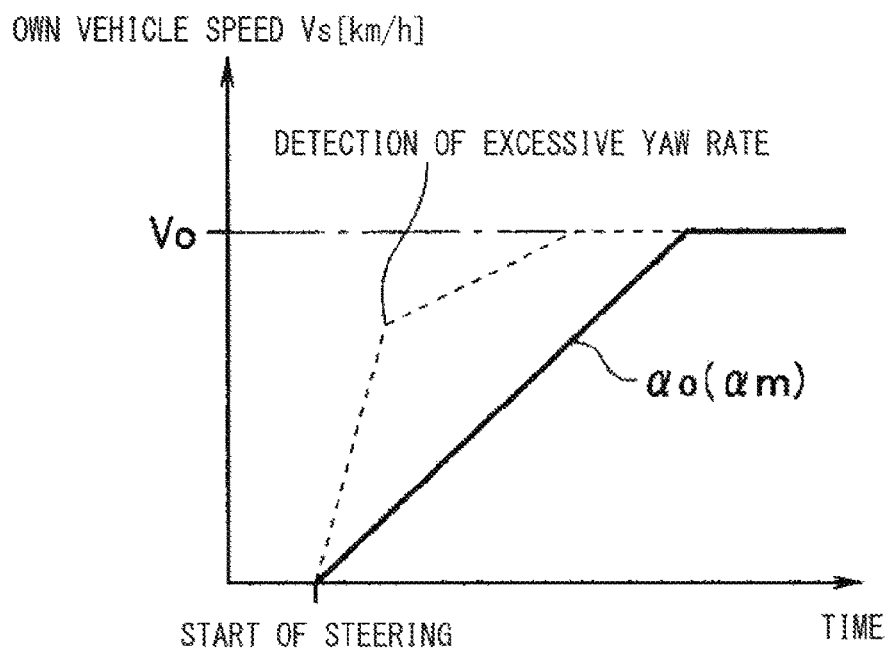
FIG. 8 is a timing chart illustrating an example of an increase in an own vehicle speed in response to a target acceleration rate.

Accordingly, the thus-set target acceleration rate αo (the own vehicle target acceleration rate αm) according to an example embodiment makes it possible to quickly reduce an acceleration rate upon the turning of the own vehicle M and to prevent the occurrence of the excessive yaw rate before it happens, as compared with a case of an existing target acceleration rate in which the target acceleration rate is reduced after the occurrence of the excessive yaw rate αs denoted by a broken line in FIG. 8. Hence, the thus-set target acceleration rate αo (the own vehicle target acceleration rate αm) according to an example embodiment makes it possible to achieve a better traveling stability.

In some embodiments, the target acceleration rate αo may be set to a lower value as with an existing case, in a case where the yaw rate detected by the yaw rate sensor 23 exceeds a preset threshold during turning of the own vehicle M.

According to an example embodiment described above, a turning state upon the ACC may be determined basically on the basis of the own vehicle speed Vs and the steering angle absolute value |θst|. Hence, it is possible to achieve a smooth turning state in response to the steering wheel operation performed by the driver without delaying a timing of reducing an acceleration rate with the ACC being maintained, even in a case where a map locator is not mounted or in a situation where it is not possible to acquire data that is based on the map locator.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, instead of the stereo camera, the traveling environment recognition unit 2 may include a distance sensor such as a millimeter-wave radar, a sonic radar, or LiDAR (Light Detection and Ranging). In some embodiments, the traveling environment recognition unit 2 may include a combination of the distance sensor and a monocular camera.

According to at least one embodiment of the technology, the steering angle correction value set on the basis of the speed of the own vehicle and the steering angle speed is added to the steering angle absolute value to set the steering angle. Further, the target acceleration rate for a cruise control is set on the basis of the thus-set steering angle and the speed of the own vehicle. Thus, the steering angle is so set as to be increased by the steering angle correction value. Hence, the target acceleration rate is reduced in response to the steering wheel operation performed by the driver. Accordingly, it is possible to make a smooth turn without delaying a timing of reducing the acceleration rate with the cruise control being maintained, even in a case where a map locator is not mounted or in a situation where it is not possible to acquire data that is based on the map locator.

An example embodiment described above explains an example of a cruise control apparatus in the case where the subject vehicle travels on a road where drivers keep to the left by law. Needless to say, if the cruise control apparatus is to be applied to a road where drivers keep to the right by law, left and right settings or the like may be appropriately set in an opposite manner.

The ACC control unit 3 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ACC control unit 3. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the ACC control unit 3 illustrated in FIG. 1.

The invention claimed is:

1. A traveling control apparatus to be applied to a vehicle, the traveling control apparatus comprising:
   a steering angle detector configured to detect a steering angle absolute value of a steering wheel of the vehicle;
   a vehicle speed detector configured to detect a speed of the vehicle; and
   a cruise control unit configured to cause the vehicle to travel at a constant speed that is based on a preset vehicle speed or cause the vehicle to travel and follow a preceding vehicle, wherein
   the cruise control unit includes:
      a turning region determining unit configured to determine whether the vehicle falls within a turning region on a basis of the steering angle absolute value and the speed of the vehicle,
      a steering angle speed detector configured to calculate a steering angle speed, on a basis of the steering angle absolute value detected by the steering angle detector, in a case where the turning region determining unit determines that the vehicle falls within the turning region,
      a steering angle correction value setting unit configured to set a steering angle correction value, on a basis of the speed of the vehicle detected by the vehicle speed detector and the steering angle speed calculated by the steering angle speed detector, in a case where the turning region determining unit determines that the vehicle falls within the turning region, and
      a target acceleration rate setting unit configured to set a target acceleration rate of a cruise control, on a basis of a steering angle and the speed of the vehicle detected by the vehicle speed detector, the steering angle being set on a basis of an addition of the steering angle correction value set by the steering angle correction value setting unit to the steering angle absolute value detected by the steering angle detector.

2. The traveling control apparatus according to claim 1, wherein in a case where the turning region determining unit determines that the vehicle falls within a turning region, an acceleration rate reduction control is to be executed.

3. The traveling control apparatus according to claim 2, further comprising a traveling environment recognizer configured to recognize a traveling environment in front of the vehicle, wherein
   the cruise control unit further includes a follow-up target acceleration rate setting unit configured to set, in a case where the traveling environment recognizer detects the preceding vehicle as a target to be followed by the vehicle, a follow-up target acceleration rate that allows the vehicle to follow the preceding vehicle, and
   the target acceleration rate setting unit is configured to compare the target acceleration rate and the follow-up target acceleration rate set by the follow-up target acceleration rate setting unit, and set one of the target acceleration rate and the follow-up target acceleration rate that is smaller in value between the target acceleration rate and the follow-up target acceleration rate as a new target acceleration rate.

4. A traveling control apparatus to be applied to a vehicle, the traveling control apparatus comprising:
   a steering angle detector configured to detect a steering angle absolute value of a steering wheel of the vehicle;
   a vehicle speed detector configured to detect a speed of the vehicle; and
   circuitry configured to:
      cause the vehicle to travel at a constant speed that is based on a preset vehicle speed or cause the vehicle to travel and follow a preceding vehicle,
      determine whether the vehicle falls within a turning region on a basis of the steering angle absolute value and the speed of the vehicle,
      calculate a steering angle speed, on a basis of the steering angle absolute value detected by the steering angle detector, in a case where the turning region determining unit determines that the vehicle falls within the turning region,
      set a steering angle correction value, on a basis of the speed of the vehicle detected by the vehicle speed detector and the calculated steering angle speed, in a case where the turning region determining unit determines that the vehicle falls within the turning region, and
      set a target acceleration rate of a cruise control, on a basis of a steering angle and the speed of the vehicle detected by the vehicle speed detector, the steering angle being set on a basis of an addition of the set steering angle correction value to the steering angle absolute value detected by the steering angle detector.

5. The traveling control apparatus according to claim 1, wherein the turning region determining unit is configured to determine whether the vehicle falls within a turning region by referring to a turning region determining table.

6. The traveling control apparatus according to claim 5, wherein the turning region determining table sets a turning region representing an increasing tendency of a value of a yaw rate based on the steering angle absolute value and the speed of the vehicle.

7. The traveling control apparatus according to claim 1, wherein the turning region determining unit is configured to determine that the vehicle falls within a turning region in a case where the vehicle makes a turn or travels along a curved road.

8. The traveling control apparatus according to claim 1, wherein the steering angle correction value is set to a larger value with an increasing tendency of a value of a yaw rate.

9. The traveling control apparatus according to claim 4, wherein the circuitry is configured to determine whether the vehicle falls within a turning region by referring to a turning region determining table.

10. The traveling control apparatus according to claim 9, wherein the turning region determining table sets a turning region representing an increasing tendency of a value of a yaw rate based on the steering angle absolute value and the speed of the vehicle.

11. The traveling control apparatus according to claim 4, wherein the circuitry is configured to determine that the vehicle falls within a turning region in a case where the vehicle makes a turn or travels along a curved road.

12. The traveling control apparatus according to claim 4, wherein the steering angle correction value is set to a larger value with an increasing tendency of a value of a yaw rate.

13. The traveling control apparatus according to claim 1, wherein the steering angle absolute value is an absolute value of a rotation angle of a steering wheel of the vehicle with respect to a neutral position of the steering wheel,
   wherein the steering angle correction value setting unit is configured to set the steering angle correction value so that (i) the steering angle correction value becomes larger as the steering angle speed becomes larger, and (ii) the steering angle correction value becomes larger as the speed of the vehicle becomes larger, and wherein the target acceleration rate setting unit is configured to set the target acceleration rate so that (i) the target acceleration rate becomes smaller as a value calculated by adding the steering angle correction value to the steering angle absolute value becomes larger, and (ii) the target acceleration rate becomes smaller as the speed of the vehicle becomes larger.

14. The traveling control apparatus according to claim 4, wherein the steering angle absolute value is an absolute value of a rotation angle of a steering wheel of the vehicle with respect to a neutral position of the steering wheel, wherein the circuitry is configured to set the steering angle correction value so that (i) the steering angle correction value becomes larger as the steering angle speed becomes larger, and (ii) the steering angle correction value becomes larger as the speed of the vehicle becomes larger, and wherein the circuitry is configured to set the target acceleration rate so that (i) the target acceleration rate becomes smaller as a value calculated by adding the steering angle correction value to the steering angle absolute value becomes larger, and (ii) the target acceleration rate becomes smaller as the speed of the vehicle becomes larger.

* * * * *